Feb. 24, 1953　　　W. B. PRIDY　　　2,629,164
PROCESS OF SLOTTING PIPE
Filed July 31, 1951
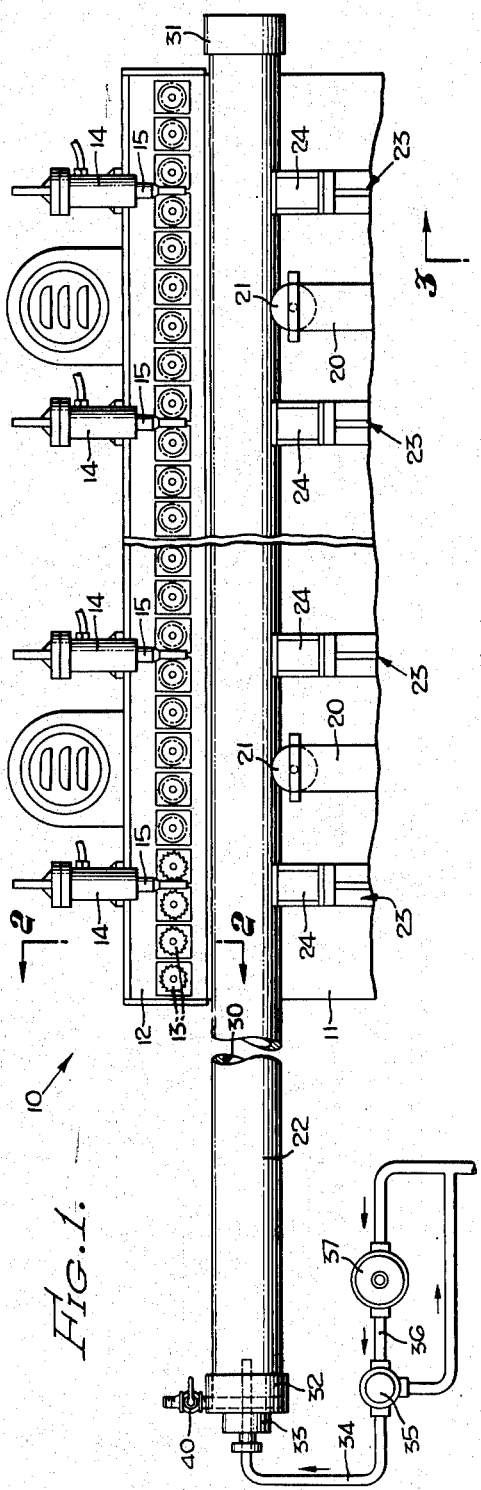
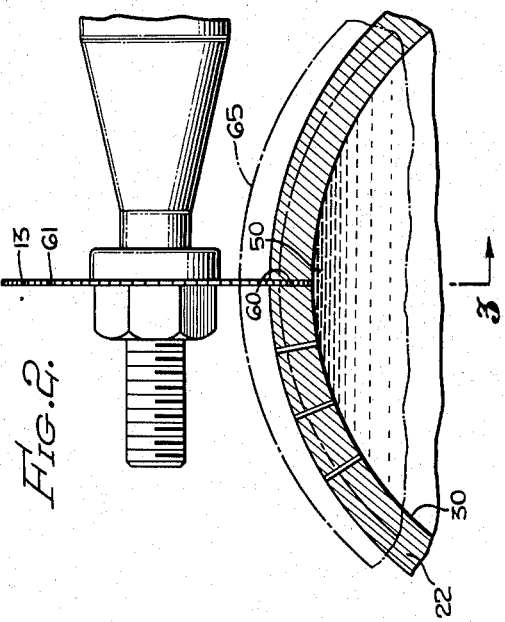
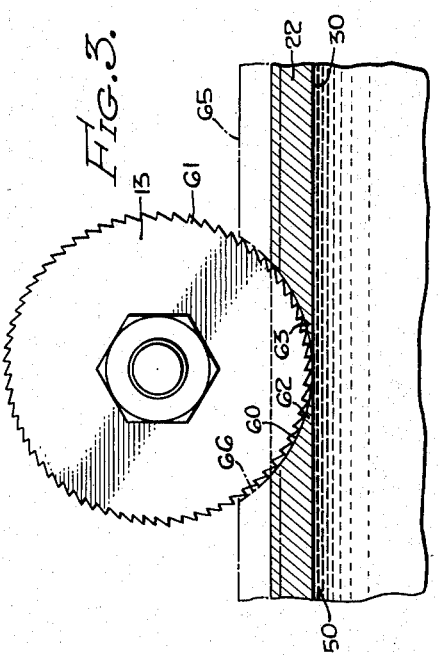
WHETSTINE B. PRIDY,
INVENTOR.
BY
ATTORNEY Patented Feb. 24, 1953

2,629,164

UNITED STATES PATENT OFFICE 2,629,164

PROCESS OF SLOTTING PIPE

Whetstine Buck Pridy, Long Beach, Calif.

Application July 31, 1951, Serial No. 239,545

6 Claims. (Cl. 29—70)

This invention relates to the cutting of slots in a wall of metal and is particularly useful in slotting screen pipe employed in wells.

One of the methods in common use for commercially producing slotted screen well pipe is by gang milling the slots in the pipe. In much of this screen pipe the slots must be quite narrow, requiring the slotting saws for producing these to be as thin as twelve thousandths of an inch. Slotting saws of this thickness are very fragile and considerable breakage has been experienced in spite of flooding these saws constantly during the slotting operation with the finest cutting oil evolved for this particular purpose.

The primary object of this invention is to provide a method of gang milling slots in a wall of metal which will substantially reduce the breakage of saws in producing narrow slots such as required in the manufacture of screen pipe.

The manner of accomplishing the foregoing object as well as further objects and advantages will be made manifest in the following description taken in connection with the accompanying drawings in which Fig. 1 is a diagrammatic fragmentary illustration of a gang mill especially adapted for the manufacture of screen pipe and illustrating a performance of the method of my invention in connection with the operation of said machine.

Fig. 2 is an enlarged diagrammatic sectional view taken on the line 2—2 of Fig. 1 and illustrating a stage in the operation of said machine and in the performance of said method in which one of the slotting saws of said machine has almost cut its way through the metal wall of a section of well pipe being slotted by said machine, the position of said pipe relative to said saw at the completion of the slotting operation being shown in broken lines in this view.

Fig. 3 is a sectional view taken on the line 3—3 of Fig. 2, the position of said pipe relative to said saw at the completion of the slotting operation being shown in broken lines in this view.

Referring specifically to the drawings, a gang milling machine 10 is shown in Fig. 1 this being of the type disclosed in detail in my co-pending application Serial No. 127,125, filed November 14, 1949, on a Method of Perforating Pipe and a Machine Therefor. The machine 10 is designed for the manufacture of slotted screen pipe and includes a base 11 having a cutter head 12 on which are mounted a gang of rotary cutting saws 13 which are rotated by a gear mechanism confined within the head 12. Mounted on the head 12 is a series of fluid pressure cylinders 14, piston rods 15 of which extend downwardly for a purpose to be explained hereinafter. The base 11 has columns 20 which rotatably support rollers 21 on the upper ends thereof, these rollers being adapted to support a section of pipe 22.

Also provided on base 11 is a pipe elevator 23 including a series of cradles 24 which extend upwardly and have V-shaped recesses in their upper ends which recesses are symmetrical relative to the vertical plane of the saws 13 in which plane the axis of pipe 22 lies when it rests on the rollers 21. Thus, by elevating the elevator 23, the cradles 24 may be caused to engage and lift pipe 22 straight upwardly with the axis of this pipe lying horizontally in the plane of saws 13.

A suitable means (not shown) is provided for supplying fluid under high pressure to the cylinders 14 to hold the piston rods 15 thereof yieldably downward against the pipe 22 to retain it firmly in centered relation with the cradles 24 and thus also with the saws 13 as said pipe is lifted by the elevator 23.

To perform a slotting operation on the pipe 22, the latter is thus lifted while the saws 13 are being rotated, so that these saws have cutting engagement with the pipe and produce a series of slots in said pipe in an end-to-end pattern in the vertical plane in which said saws lie. Throughout this slotting operation streams of cutting oil are constantly played on the saws 13 from above by a cutting oil flood system (not shown) such as are in common use on metal cutting machine tools.

The foregoing steps are part of the invention disclosed in said co-pending application which also includes the steps of lowering the pipe 22 after the first slotting operation to withdraw the saws 13 from the slots formed thereby, progressively rotating pipe 22 in the cradles 24 by uniform stages and after each such stage, repeating the initial slotting operation, thereby forming a series of groups of slots in said pipe, all like the first group, this series extending entirely around the pipe.

The unique steps in the present invention include forming an enclosed chamber 30 within the pipe 22 as by covering one end of the latter with a solid cap 31 and the other end by a cap 32 having a stuffing box 33 through which an oil line 34 connects a pressure regulator 35 in the discharge line 36 of a cutting oil pump 37 with the chamber 30. Thus said chamber is filled with cutting oil, all air being carefully removed from said chamber as through a pet cock 40 provided in the cap 32, and the oil in said chamber is maintained at a superatmospheric pressure according to the setting of said pressure regulator.

In performing the method of the present invention the pipe 22 is thus filled with a body of cutting oil 50 and this body is maintained under a pressure of preferably about 150 lbs. to the square inch throughout the entire series of slotting operations above described. This pressure has been found preferable where the cutting saws 13 have a thickness in the general order of 12 thousandths of an inch.

Among those tried to date, the commercial cutting oil best adapted for the performance of the method of my invention under the specific circumstances above outlined has a staybolt reading of 145 plus or minus at 100 degrees F. and 42 plus or minus at 210 degrees F. and this oil has a viscosity index of 76.

In practicing my invention I prefer to clean the outer surface of the pipe 22 by sandblasting this free of dirt and rust before placing the same in the machine 10. A smooth, clean metallic surface is thus presented to all of the saws 13 as they are brought into contact with the exterior of the pipe as the latter is lifted upwardly.

Dependence is had for lubrication of the saws 13 on the cutting oil saw flooding system, up to the point illustrated in full lines in Fig. 3 where a saw 13 is shown as just about to break through the wall of the pipe 22. As each saw 13 breaks through this wall the cutting oil 50 immediately flows into the slot 60 being formed by said saw and assures ample lubrication of the teeth 61 of the saw where these teeth engage the fins 62 and 63 which form at the opposite ends of the opening through which this slot initially communicates with the chamber 30 within the pipe 22.

The feeding upwardly of the pipe 22 then continues, until it reaches the elevation indicated by broken lines 65 in Figs. 2 and 3. This produces screening slots 66 with inward openings of substantial length which, of course, is the object of the slotting operation. Upon reaching its position 65, the pipe 22 is immediately lowered whereby the saws 13 are withdrawn from the slots 66, after which the pipe 22 is rotated a fraction of a revolution in preparation for starting another slotting operation.

Where the cutting saws 13 have a thickness of approximately 12 thousandths of an inch the slots 66 formed thereby are so narrow that a cutting oil of the preferred specifications above indicated, when maintained under a pressure of 150 lbs. per square inch, escapes through these slots after the saws 13 have been withdrawn therefrom at such a slow rate as to require the feeding of only a small amount of additional oil into the chamber 30 of the pipe in order to maintain the body of cutting oil 50 under this pressure throughout the series of slotting operations required to finish the conversion of the pipe length 22 into a length of slotted screen pipe.

My invention has introduced a marked economy in the production of slotted screen pipe having relatively narrow slots by greatly decreasing the breakage of saws 13 in said production. Prior to the introduction of the unique steps of my method into the production of this kind of pipe it was not uncommon to experience the breakage of thirty-five of the saws 13 in the manufacture of one forty foot length of pipe. By adding the steps of my invention to the process of manufacture, the same kind of slotted screen pipe was produced with the same milling machine and the same type of saws 13, with a loss of only eight saws in the manufacture of a forty foot length of screen pipe.

While the method of my invention is especially useful in the manufacture of slotted screen pipe the slots of which are extremely narrow, it is also applicable to other metal cutting operations in which pressure lubrication at the inner surface of a wall of metal at the moment the cutting tool breaks through said surface can reduce tool failure previously resulting from faulty lubrication at this critical point of the operation.

The claims are:

1. A method of cutting a relatively narrow slot in a wall of metal, with a rotating milling saw comprising enclosing a chamber, one of the confining walls of which is formed by said wall of metal, introducing a lubricant into said chamber, maintaining said lubricant under a substantial pressure, cutting said slot through said wall of metal from outside of said chamber so that said slot opens into said chamber, by attacking said wall with said rotating milling saw, and flooding said saw with a lubricant during the cutting of said slot.

2. A method of forming a relatively narrow slot in the wall of a section of pipe by the application of a rotating milling saw to the external surface of said wall which comprises closing opposite ends of the interior of said pipe section to form a closed chamber within said pipe section, introducing a lubricant into said chamber, placing said lubricant under a substantial superatmospheric pressure, applying said rotating saw to said portion of said pipe to cut said slot through said wall of said pipe from the outside so that said slot when formed opens inwardly into said chamber, and flooding said saw outside said pipe with a lubricant during the cutting of said slot.

3. A method of cutting a relatively narrow slot in a wall of metal with a rotating milling saw comprising enclosing a chamber, one of the confining walls of which is formed by said wall of metal, introducing a cutting oil into said chamber, maintaining said cutting oil under a substantial pressure, cutting said slot through said wall of metal from outside of said chamber so that said slot opens into said chamber, by attacking said wall with said rotating milling saw, and flooding said saw with a cutting oil during the cutting of said slot.

4. A method of forming a relatively narrow slot in the wall of a section of pipe by the application of a rotating milling saw to the external surface of said wall which comprises closing opposite ends of the interior of said pipe section to form a closed chamber within said pipe section introducing cutting oil into said chamber, placing said cutting oil under a substantial superatmospheric pressure, applying said rotating saw to said portion of said pipe to cut said slot through said wall of said pipe from the outside so that said slot when formed opens inwardly into said chamber, and flooding said saw outside said pipe with cutting oil during the cutting of said slot.

5. A method of manufacturing screen pipe with a gang mill having a multiplicity of rotating cutting saws which comprises closing opposite ends of a length of well pipe, introducing cutting oil into said pipe, placing said cutting oil thus confined under a substantial super-atmospheric pressure, causing relative movement between said saws and said pipe to bring said saws into cutting engagement with said pipe, and continuing said relative movement to cause said saws to cut slots through the wall of said pipe from the outside thereof and in a given pattern along said pipe, flooding said saws with cutting oil during said slotting operation, withdrawing said saws from said slots, rotating said pipe progressively by stages and, after each stage of rotation, repeating said pipe slotting operation to form a series of groups of slots in the aforesaid pattern about said pipe, and adding cutting oil to the interior of said pipe through the aforesaid series of operations to maintain said super-atmospheric pressure in said cutting oil confined within said pipe, in spite of the escape of cutting oil outwardly from the interior of said pipe through said slots.

6. A method of cutting a hole in a wall of metal with a rotating metal cutting tool comprising enclosing a chamber one of the confining walls of which is formed by said wall of metal, introducing a lubricant into said chamber, maintaining said lubricant under a substantial super-atmospheric pressure, cutting said hole through said wall of metal from outside of said chamber, so that said hole opens into said chamber, by attacking said wall with said rotating metal cutting tool, and flooding said rotating tool with a lubricant during the cutting of said hole.

WHETSTINE BUCK PRIDY.

REFERENCES CITED

The following references are of record in the file of this patent:

UNITED STATES PATENTS

| Number | Name | Date |
| --- | --- | --- |
| 1,207,808 | Steps | Dec. 12, 1916 |